United States Patent
Cho

(10) Patent No.: US 7,497,141 B2
(45) Date of Patent: Mar. 3, 2009

(54) CONTROL SYSTEM OF STARTING MOTOR FOR AUTOMATIC TRANSMISSION VEHICLE

(75) Inventor: Tae Hee Cho, Suwon (KR)

(73) Assignee: Hyundai Motor Company, Seoul (KR)

( * ) Notice: Subject to any disclaimer, the term of this patent is extended or adjusted under 35 U.S.C. 154(b) by 422 days.

(21) Appl. No.: 11/507,912

(22) Filed: Aug. 21, 2006

(65) Prior Publication Data

US 2007/0135262 A1 Jun. 14, 2007

(30) Foreign Application Priority Data

Dec. 9, 2005 (KR) .................. 10-2005-0120952

(51) Int. Cl.
*F16H 59/00* (2006.01)
(52) U.S. Cl. ...................................... 74/335
(58) Field of Classification Search ............. 477/101, 477/102; 74/335
See application file for complete search history.

(56) References Cited

U.S. PATENT DOCUMENTS 3,151,249 A * 9/1964 Ives ..................... 290/38 A
6,238,255 B1 * 5/2001 Takase ..................... 440/1
2003/0045399 A1 * 3/2003 Lee ......................... 477/118
2004/0121667 A1 * 6/2004 Okabe ...................... 440/87

FOREIGN PATENT DOCUMENTS

| JP | 05-209584 | 8/1993 |
|----|-----------|--------|
| JP | 09-053551 | 2/1997 |
| KR | 10-1997-0045356 A | 7/1997 |
| KR | 10-1999-0052802 A | 7/1999 |

* cited by examiner

*Primary Examiner*—Ha D. Ho
(74) *Attorney, Agent, or Firm*—Morgan Lewis & Bockius LLP

(57) ABSTRACT

A control system of a starting motor for an automatic transmission vehicle includes a starting switch having a plurality of nodes and an ignition key for connecting the plurality of nodes to a battery, a position sensor detecting a shift lever position and generating a pulse width modulation signal corresponding thereto, a shift control module receiving the pulse width modulation signal from the position sensor and generating a starting control signal, and a starting relay electrically connected to the starting switch and the shift control module and applying the battery power to the starting motor, wherein the shift control module generates the starting control signal if the shift lever position is a P position or an N position.

11 Claims, 3 Drawing Sheets

CONTROL SYSTEM OF STARTING MOTOR FOR AUTOMATIC TRANSMISSION VEHICLE

CROSS-REFERENCE TO RELATED APPLICATION

This application claims priority to and the benefit of Korean Patent Application No. 10-2005-0120952 filed in the Korean Intellectual Property Office on Dec. 9, 2005, the entire contents of which are incorporated herein by reference.

BACKGROUND OF THE INVENTION (a) Field of the Invention

The present invention relates to a control system of a starting motor for an automatic transmission vehicle. More particularly, the present invention relates to a control system of a starting motor for an automatic transmission vehicle that prevents a malfunction of the starting motor.

(b) Description of the Related Art

An engine of an automatic transmission vehicle can be started only when a shift lever position is parking (P) or neutral (N). Such function is controlled by an inhibitor switch. If the D, 2, L, or R node is selected in the inhibitor switch, the engine is not started.

However, the inhibitor switch may not determine an exact position of the shift lever because of a complex structure of the inhibitor switch and wearing of the nodes of the inhibitor switch.

To solve such problems, a control system of a starting motor using a position sensor has been designed.

In such a system, a position sensor detects a shift lever position and generates a signal corresponding thereto. A shift control module receives the signal and determines whether the shift lever position is the parking (P) or neutral (N) position. The shift control module controls the starting relay so as to operate the starting motor.

However, when the vehicle is exposed to very low temperatures, battery voltage drops rapidly in a few milliseconds. Accordingly, the processor does not operate normally because of the low battery voltage. Therefore, the processor does not control the starting relay. The engine thus may not start in very low temperatures.

To solve such problems, the shift control module further includes a buffer so that the engine can be started in very low temperatures when the processor does not operate normally. The buffer amplifies the starting control signal transmitted from the processor and outputs the starting control signal to a first switching element.

However, since the buffer is used to start the engine in very low temperatures, many problems may occur. Since the starting control signal of the processor is amplified by the buffer during a predetermined time $\Delta T1$, the starting control signal applied to the starting relay is delayed.

Therefore, if the shift lever position is changed to a drive (D) position or a reverse (R) position during the delay time, the starting relay is turned on regardless of the shift lever position. Thus, problems such as a quick start may occur. Such problems may occur under normal conditions as well as in very low temperatures.

The above information disclosed in this Background section is only for enhancement of understanding of the background of the invention and therefore it may contain information that does not form the prior art that is already known in this country to a person of ordinary skill in the art.

SUMMARY OF THE INVENTION

A control system of a starting motor for an automatic transmission vehicle according to an exemplary embodiment of the present invention may include: a starting switch having a plurality of nodes and an ignition key for connecting the plurality of nodes to the battery; a position sensor detecting a shift lever position and generating a pulse width modulation signal corresponding thereto; a shift control module receiving the pulse width modulation signal from the position sensor and generating a starting control signal; and a starting relay electrically connected to the starting switch and the shift control module, and applying the battery power to the starting motor, wherein the shift control module generates the starting control signal when the shift lever position is a P position or an N position.

The shift control module may include: a buffer for amplifying the starting control signal applied to the starting relay; a first switching element for receiving the starting control signal from the buffer and performing a switching operation; a processor for transmitting the starting control signal to the buffer, the processor connected to the position sensor and receiving the signal corresponding to the shift lever position; and a second switching element for receiving the starting control signal from the processor and performing a switching operation, the second switching element connected to the first switching element.

The first switching element and the second switching element may be coupled in series with each other.

The first switching element may include: a drain terminal connected to a terminal of the starting relay; a gate terminal connected to an output terminal of the buffer; and a source terminal.

The second switching element may include: a drain terminal connected to the source terminal of the first switching element; a gate terminal connected to an output terminal of the processor; and a source terminal connected to ground.

The second switching element may perform the switching operation according to the starting control signal of the processor when the processor operates normally.

The second switching element may perform the switching operation according to the starting control signal of the buffer when the processor does not operate normally.

The shift control module may further include a resistor and a diode coupled in parallel to the first and second switching elements.

The diode may rectify the starting control signal of the processor so the signal is not directly input to the first switching element.

The processor may receive the pulse width modulation signal from the position sensor and generate the starting control signal only when a starting condition is satisfied.

The starting condition may be satisfied when an ACC or ON node of the starting switch is selected and the engine is not running.

DETAILED DESCRIPTION OF THE PREFERRED EMBODIMENTS

An exemplary embodiment of the present invention will hereinafter be described in detail with reference to the accompanying drawings.

Figure 1:
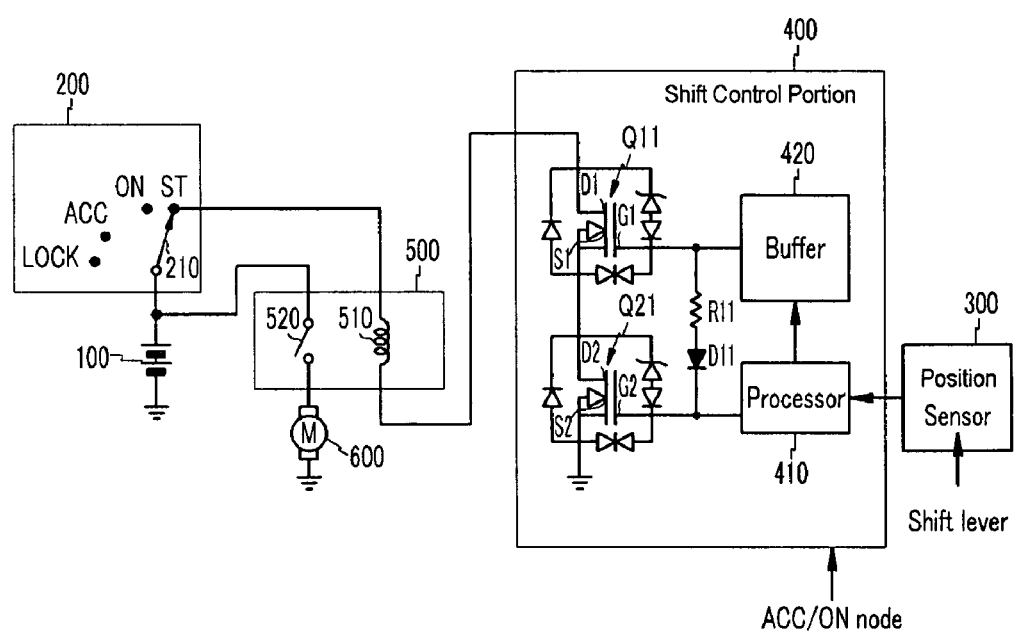
FIG. 1 is a schematic diagram of a control system of a starting motor for an automatic transmission vehicle according to an exemplary embodiment of the present invention.

As shown in FIG. 1, a control system of a starting motor for an automatic transmission vehicle according to an exemplary embodiment of the present invention includes a battery 100, a starting switch 200, a position sensor 300, a shift control module 400, a starting relay 500, and a starting motor 600.

The battery 100 is mounted on the vehicle and supplies a power to the starting motor 600 when an engine starts.

The starting switch 200 has a plurality of nodes, for example, LOCK, ACC, ON, and ST. When one of the nodes is selected by an ignition key 210, the battery power is supplied to loads. If the ST node is selected, the starting motor 600 starts the engine.

The position sensor 300 transforms a signal corresponding to a shift lever position into a pulse width modulation (PWM) signal, and transmits the PWM signal to the shift control module 400.

If a starting condition is satisfied and the engine is not running, the shift control module 400 receives the PWM signal from the position sensor 300 and determines the shift lever position. If the shift lever position is park (P) or neutral (N), the shift control module 400 outputs a starting control signal to the starting relay 500. The starting condition may be satisfied when an ACC or ON node of the starting switch is selected and the engine is not running.

When the starting control signal is transmitted to the starting relay 500 from the shift control module 400, and the ST node of the starting switch is selected, an inner coil 510 of the starting relay 500 is magnetized and generates a magnetic force. Therefore, an inner switch 520 of the starting relay 500 is turned on and the battery power is supplied to the starting motor 600. The starting motor 600 is thus operated by the battery power supplied from the starting relay 500 and starts the engine.

The shift control module 400 includes a processor 410, a buffer 420, a first switching element Q11, a second switching element Q21, a resistor R11, and a diode D11.

The processor 410 controls an overall process of the shift control module 400.

When the starting condition is satisfied and the engine is not running, the processor 410 receives the PWM signal from the position sensor 300. If the shift lever position is the P or N position, the processor 410 outputs the starting control signal to the buffer 420 and the second switching element Q21.

The buffer 420 amplifies the starting control signal transmitted form the processor 410 so as to improve a startability of the engine in very cold temperatures.

The first switching element Q11 has a drain terminal D1 connected to a terminal of the starting relay, a gate terminal G1 connected to an output terminal of the buffer 420, and a source terminal S1. The first switching element performs a switching operation according to the starting control signal transmitted from the buffer 420.

The second switching element Q21 has a drain terminal D2 connected to the source terminal S1 of the first switching element Q11, a source terminal S2 connected to ground, and a gate terminal G2 connected to an output terminal of the processor 410. The second switching element Q21 performs a switching operation according to the starting control signal directly transmitted from the processor 410 when the processor 410 operates normally. However, the second switching element Q21 performs the switching operation according to the starting control signal indirectly transmitted from the buffer 420 when the processor 410 does not operate normally.

The first switching element Q11 and the second switching element Q21 are coupled in series with each other.

The resistor R11 and the diode D11 are coupled in series with each other, parallel to the first switching element Q11 and the second switching element Q21.

The diode D11 transmits the starting control signal of the first switching element Q11 to the second switching element Q21 when the processor 410 does not operate normally.

Therefore, the second switching element Q21 receives the starting control signal of the buffer 420 transmitted to the first switching element Q11 and performs the switching operation when the processor 410 does not operate normally, such as in very cold temperatures. The second switching element Q21 receives the starting control signal of the processor 410 and performs the switching operation when the engine is started and the processor 410 operates normally.

The diode D11 rectifies the starting control signal of the processor 410 so as not to be directly input to the first switching element Q11.

Hereinafter, referring to the drawings, a control process of the control system of the starting motor for the automatic transmission vehicle according to the exemplary embodiment of the present invention will be described in detail.

Figure 2:
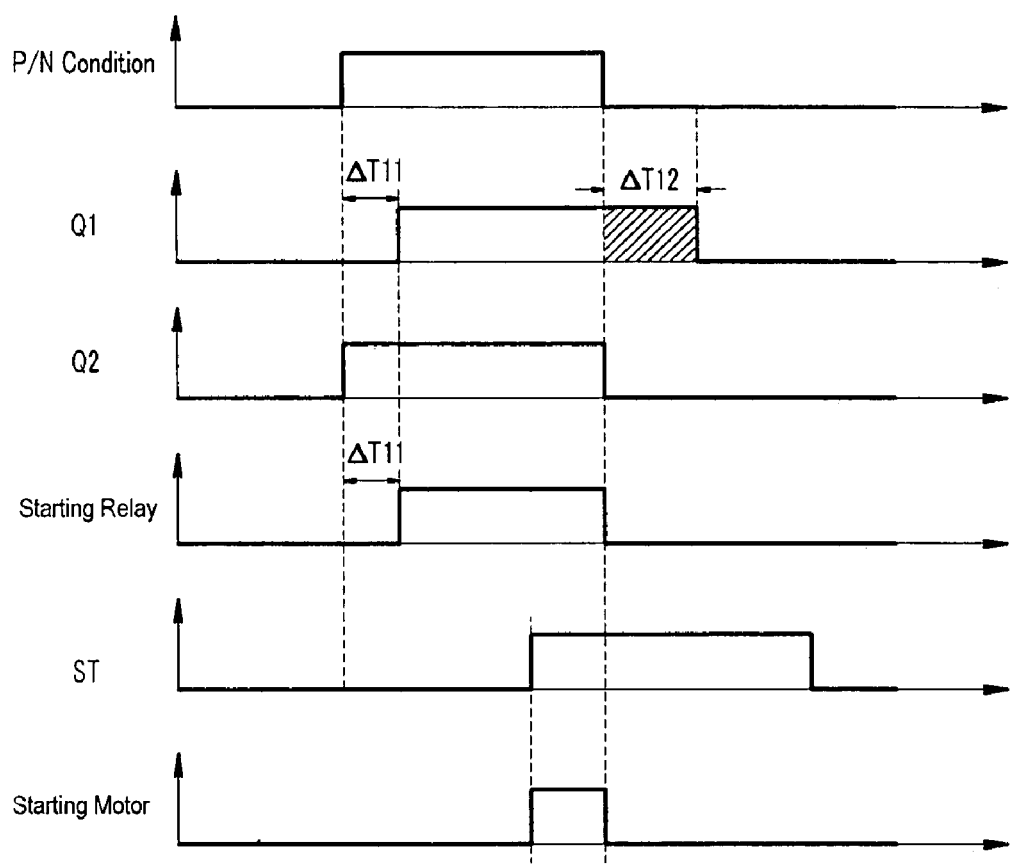
FIG. 2 illustrates operational timings of a starting control signal under normal conditions according to an exemplary embodiment of the present invention.

As shown in FIG. 2, a driver controls the starting switch 200 when the engine is not running. Then, the processor 410 of the shift control module 400 detects that the ACC or ON node of the starting switch 200 is selected.

The processor 410 then determines that the starting condition is satisfied. The processor 410 receives the PWM signal from the position sensor 300 and determines the shift lever position according to the PWM signal.

If the shift lever position is park or neutral, the processor 410 outputs the starting control signal to the gate terminal G2 of the second switching element Q21, and to the buffer 420.

The buffer 420 amplifies the starting control signal input from the processor 410 during a predetermined time ΔT11, and then transmits the starting control signal to the gate terminal G1 of the first switching element Q11.

Therefore, the starting control signal is applied to the starting relay 500 by a switching operation of the first switching element Q11 and the second switching element Q21 coupled in series with each other.

In this state, if the starting relay 500 detects a selection of the ST node in the starting switch 200, the inner coil 510 of the starting relay 500 is magnetized and generates the magnetic force. Therefore, the inner switch 520 of the starting relay 500 is turned on.

Thus, the battery power is supplied to the starting motor 600 which starts the engine.

When the starting control signal of the processor 410 is not supplied to the buffer 420 and the second switching element Q21 when the engine is being started, the second switching element Q21 directly controlled by the processor 410 is turned off.

In addition, the first switching element Q11 controlled by the buffer 420 is maintained to be turned on during a delay time ΔT12.

However, since the second switching element Q21 is turned off regardless of the switching operation of the first switching element Q11, the starting control signal is not applied to the starting relay 500.

Therefore, if the shift lever position is changed to the drive (D) or reverse (R) position when the engine is being started, the vehicle does not start.

Figure 3:
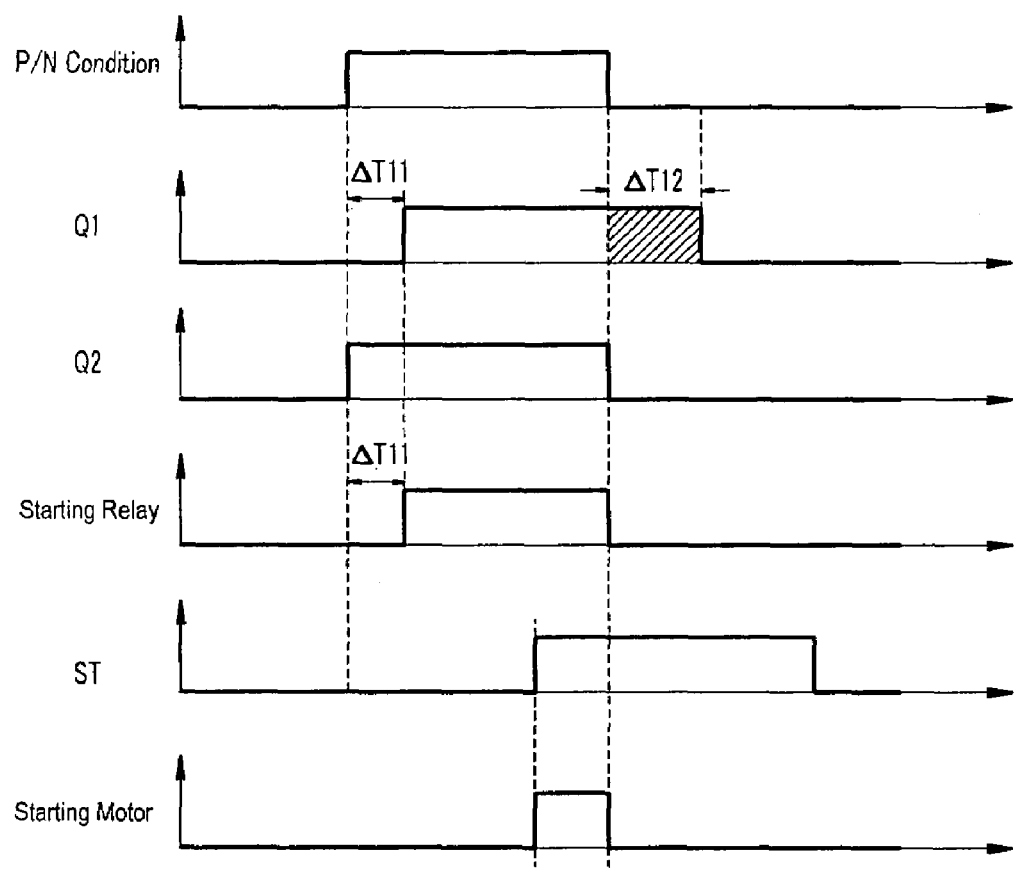
FIG. 3 illustrates operational timings of the starting control signal at very low temperatures according to an exemplary embodiment of the present invention.

As shown in FIG. 3, in very low temperatures, a driver controls the starting switch 200 when the engine is not running. Then, the processor 410 of the shift control module 400 detects that the ACC or ON node of the starting switch 200 is selected.

The processor 410 then determines that the starting condition is satisfied. The processor 410 receives the PWM signal from the position sensor 300 and determines the shift lever position according to the PWM signal.

If the shift lever position is park or neutral, the processor 410 outputs the starting control signal to the gate terminal G2 of the second switching element Q21.

Since the processor 410 is not operating normally due to very low temperatures, the second switching element Q21 is not turned on.

The buffer 420 amplifies the starting control signal of the processor 410 during the predetermined time ΔT11, and then transmits the starting control signal to the gate terminal G1 of the first switching element Q11.

The starting control signal of the first switching element Q11 is transmitted to the second switching element Q21, and the second switching element Q11 is turned on. Therefore, the starting control signal is applied to the starting relay 500 by the switching operation of the first switching element Q11 and the second switching element Q21 coupled in series with each other.

In this state, if the starting relay 500 detects the selection of the ST node in the starting switch 200, the inner coil 510 of the starting relay 500 is magnetized and generates the magnetic force. Therefore, the inner switch 520 of the starting relay 500 is turned on.

Thus, the battery power is supplied to the starting motor 600 which starts the engine.

When the engine is being started, the processor 410 is restored to a normal state. Thus, the second switching element Q21 is directly controlled by the processor 410.

Therefore, when the starting control signal of the processor 410 is not supplied to the buffer 420 and the second switching element Q21, the second switching element Q21 directly controlled by the processor 410 is turned off.

In addition, the first switching element Q11 controlled by the buffer 420 is maintained to be turned on during the delay time ΔT12.

However, since the second switching element Q21 is turned off regardless of the switching operation of the first switching element Q11, the starting control signal is not applied to the starting relay 500.

Therefore, if the shift lever position is changed to the D or R position when the engine is started, the vehicle does not start.

As described above, according to the exemplary embodiments of the present invention, startability of a vehicle in very low temperatures is enhanced and the starting motor does not operate when the shift lever position is the D or R position. Therefore, stability and reliability may be enhanced since the vehicle is prevented from a quick start.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A control system of a starting motor for an automatic transmission vehicle that operates the starting motor by applying a battery power thereto, the control system comprising:

a starting switch having a plurality of nodes and an ignition key for connecting the plurality of nodes to the battery;

a position sensor for detecting a shift lever position and generating a signal corresponding thereto;

a shift control module for receiving the shift lever position signal and generating a first starting control signal if the shift lever position is park or neutral; and a starting relay electrically connected to the starting switch and the shift control module, and applying the battery power to the starting motor.

2. The system of claim 1, wherein the shift control module comprises:

a buffer for amplifying the first starting control signal and outputting a second starting control signal;

a first switching element for receiving the second starting control signal and performing a first switching operation;

a processor for transmitting the first starting control signal to the buffer, wherein the processor is configured to be connected to the position sensor and receive the shift lever position signal; and a second switching element, configured to be connected to the first switching element, for receiving the first starting control signal from the processor and performing a second switching operation.

3. The system of claim 2, wherein the first switching element and the second switching element are connected in series with each other.

4. The system of claim 3, wherein the first switching element comprises:

a first drain terminal connected to a terminal of the starting relay;

a first gate terminal connected to an output terminal of the buffer; and a first source terminal.

5. The system of claim 4, wherein the second switching element comprises:

a second drain terminal connected to the first source terminal;

a second gate terminal connected to an output terminal of the processor; and a second source terminal connected to a ground.

6. The system of claim 2, wherein the second switching element performs the second switching operation according to the first starting control signal of the processor when the processor operates normally.

7. The system of claim 6, wherein the second switching element performs the switching operation according to the second starting control signal when the processor does not operate normally.

8. The system of claim 2, wherein the shift control module further comprises a resistor and a diode coupled in series, parallel to the first and second switching elements.

9. The system of claim 8, wherein the diode rectifies the first starting control signal so the first starting control signal is not directly input to the first switching element.

10. The system of claim 2, wherein the processor receives the shift lever position signal from the position sensor and generates the first starting control signal only if a starting condition is satisfied.

11. The system of claim 10, wherein the starting condition is satisfied if an accessory node or an on node of the starting switch is selected, and an engine is not running.

* * * * *